United States Patent [19]

Yamagiwa et al.

[11] Patent Number: 5,798,484
[45] Date of Patent: Aug. 25, 1998

[54] ENCLOSED ELECTRIC CONDUCTOR ARRANGEMENT

[75] Inventors: Tokio Yamagiwa; Fumihiro Endo, both of Hitachi; Kazutoshi Asano, Yonezawa, all of Japan

[73] Assignee: Hitachi, Ltd., Tokyo, Japan

[21] Appl. No.: 194,375

[22] Filed: Feb. 8, 1994

[30] Foreign Application Priority Data

Feb. 10, 1993 [JP] Japan .................................. 5-022357

[51] Int. Cl.$^6$ .......................... H02G 5/06; H02B 13/055
[52] U.S. Cl. .......................... 174/14 R; 174/16.2; 174/28
[58] Field of Search .......................... 174/14 R, 16.2, 174/17 GF, 99 R, 28, 68.2, 99 B; 361/604, 605, 611, 612; 218/68, 69, 75, 82

[56] References Cited

U.S. PATENT DOCUMENTS

| | | | |
|---|---|---|---|
| 3,898,408 | 8/1975 | Cookson et al. | 218/43 |
| 4,029,890 | 6/1977 | Nakata | 174/14 R |
| 4,029,891 | 6/1977 | Nakata | 174/14 R |
| 4,029,892 | 6/1977 | Nakata | 174/14 R |
| 4,042,774 | 8/1977 | Nakata et al. | 174/14 R |
| 4,328,391 | 5/1982 | Cookson | 174/14 R |
| 4,554,399 | 11/1985 | Cookson | 174/14 R |

FOREIGN PATENT DOCUMENTS

| | | |
|---|---|---|
| 4104922 | 8/1992 | Germany . |
| 0140188 | 10/1979 | Japan ................. 174/14 R |
| 59-204413 | 11/1984 | Japan . |
| 0544034 | 4/1977 | Russian Federation ............. 174/14 R |

OTHER PUBLICATIONS

M. Ouyang et al. "Novel Design Concepts Of A Compressed Gas HVDC Transmission Line", IEEE Transactions on Power Apparatus and Systems, Jun.-Jul. 1982, PAS-101, No. 2, New York.

"DC Insulation of Gas Insulated Switchgear", a technical report of Japan Institute of Electrical Engineers (Part II), No. 397, 1991, pp. 9-17.

*Primary Examiner*—Hyung S. Sough
*Attorney, Agent, or Firm*—Fay, Sharpe, Beall, Fagan, Minnich & McKee

[57] ABSTRACT

A gas filled electric conductor arrangement has an inclined surface (3A) at the bottom side of an electric conductor (3) that is formed by gradually reducing the cross section (D1, D2) of the electric conductor from one insulator spacer (2A) at one side toward another insulator spacer (2B) at the other side. Because of an angle (θ) of the inclined surface (3A), the spacing distance between the electric conductor (3) and the bottom surface (1A) of a grounded tank (1) increases depending upon the distance away from one insulator spacer (2A). Thereby, conductive foreign particles (50) are designed to be moved away from the surface of the insulator spacer (2A) and become trapped by a conductive foreign particle (1) disposed at the center bottom surface (1A) of the grounded tank.

2 Claims, 3 Drawing Sheets 5,798,484

1

ENCLOSED ELECTRIC CONDUCTOR ARRANGEMENT

BACKGROUND OF THE INVENTION

1. Field of the Invention

The present invention generally relates to an electric power transformation installation and, in particular, relates to an enclosed electric conductor arrangement for a DC current transmission in which an insulating gas and an electric conductor are sealingly enclosed in a tubular container.

2. Description of Related Art

One of the signification problems regarding electric insulation of gas insulated apparatuses for a DC current transmission such as an enclosed electric conductor arrangement is a reduction of insulating property thereof due to conductive foreign particles incidentally contained within the apparatuses. Different from similar apparatuses for an AC current transmission, electric field under an application of DC voltage always directs to a predetermined direction so that when a conductive foreign particle within the apparatus is once lifted up by the electric field, the conductive foreign particle moves up to a high voltage electric conductor while maintaining the lifted condition. As a result, the conductive foreign particle deposits such as on a portion of high electric field and on a surface of an insulator which endangers the insulating property of these apparatuses.

For countermeasuring the above problem, such measures, which make use of a specific behavior of a conductive foreign particle under electric field, as disposing inclinedly a tubular container and as providing a conductive foreign particle trapping device on the bottom surface of the container are disclosed, for example, in a technical report of Japan Institute of Electrical Engineers (part II) No. 397 "DC insulation for gas insulated switchgear" (1991, 12, PP 12).

However, the conductive foreign particle under a DC voltage application behaves as explained above, in that, the conductive foreign particle easily reaches to a high voltage conductor side once the particle is lifted up so that such countermeasures as providing an inclination at the container side was insufficient.

SUMMARY OF THE INVENTION

An object of the present invention is to provide an enclosed electric conductor arrangement which improves insulation reliability as well as reduces size and weight thereof by introducing a further reliable trapping scheme of conductive foreign particles.

In the enclosed electric conductor arrangement for the gas insulated apparatus according to the present invention in which a plurality of insulator spacers are disposed in a grounded tank, an electric conductor is insulatedly supported between the insulator spacers and an insulating gas is sealingly filled in the grounded tank, at least a bottom side of the electric conductor is formed in an inclined surface such as by gradually reducing the cross sectional area of the electric conductor from one insulator spacer toward the other.

When a DC voltage is applied to the electric conductor, an up and down jumping phenomenon of a conductive foreign particle is repeated, in that, a conductive foreign particle on the bottom surface of the grounded tank is electrically charged, attracted toward the electric conductor which is oppositely charged and then impinges against the electric conductor, thus the polarity of the conductive foreign par-

2 ticle is equalized with that of the electric conductor so that the conductive foreign particle again drops on the bottom surface of the grounded tank. However, since the spacing distance between the electric conductor and the bottom surface of the grounded tank increases depending on the distance away from the insulator spacers because of the inclined surface, the conductive foreign particles is collected at a low electric field region where the spacing distance between the inclined surface and the bottom surface of the grounded tank is maximum and is trapped there. Accordingly deposition of the conductive foreign particle on the surface of the insulator spacers is avoided and insulation reliability of enclosed electric conductor arrangement for the gas insulated apparatus is enhanced.

DESCRIPTION OF THE EMBODIMENTS

Figure 1:
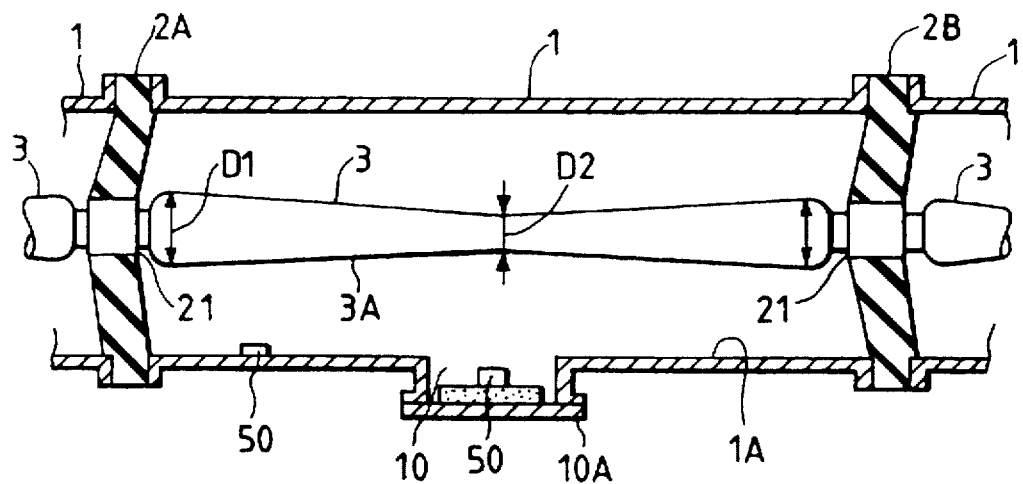
FIG. 1 is a cross sectional view showing one embodiment of enclosed electric conductor arrangements according to the present invention.

Hereinbelow, one embodiment of the present invention is explained with reference to FIG. 1 which shows an enclosed electric conductor arrangement for a gas insulated apparatus accommodating a bus bar or electric conductor in an enclosed gas filled tubular container.

A plurality of grounded tanks 1 are each in a cylindrical shape and inside the grounded tank 1 a plurality of insulator spacers 2A and 2B are fastened between flanges of a pair of the grounded tanks 1 by bolts and nuts and are supported thereby. A central electric conductor 3 of substantially a cylindrical shape is disposed between a pair of the insulator spacers 2A, 2B.

On the central electric conductor 3 connected to a connecting electric conductor 21 which is supported by the spacers 2A, 2B, an inclined surface 3A is formed by gradually reducing the diameter of the central electric conductor 3 from diameter D1 at the connecting electric conductor 21 to diameter D2 at the center portion thereof. Namely, the inclined surface 3A is formed by gradually reducing the diameter of the central electric conductor 3 from D1 to D2 starting from one insulator spacer 2A side toward the other insulator spacer 2B side. The inclined surface 3A is formed by minimizing the diameter D2 of the central electric conductor 3 at the center between the insulator spacers 2A and 2B.

At the center portion on the bottom surface 1A of the grounded tank 1 facing to the central electric conductor 3 having the diameter D2 and showing the maximum spacing distance between the inclined surface 3A and the bottom surface 1A, a conductive foreign particle trapping means 10 in a form of a recess is provided. The conductive foreign particle trapping means 10 catches a conductive foreign particle 50 by making use of such as a lower electric field portion formed by the recess, an adhesive sheet or a magnetic rubber ferrite. In the present embodiment, the conductive foreign particle trapping means 10 is provided with a detachable closing plate 10A so that during inspection and maintenance the closing plate 10A is detached and, for example, the adhesive sheet or the magnetic rubber ferrite catching a conductive foreign particle 50 is replaced with a new adhesive sheet and a new magnetic rubber ferrite. However, when the conductive foreign particle trapping means 10 is constituted by the recess showing a lower electric field, no such replacement is required.

As a result of an investigation by the present inventors on the behavior of the conductive foreign particle 50 under a DC voltage application in a coaxial cylindrical electrode system constituted by the grounded tank 1 and the central electric conductor 3, the following four kinds of basic behaviors of the conductive foreign particle 50 are observed which although varies depending upon such as shape of the conductive foreign particle 50, magnitude of applied voltage and polarity thereof.

(1) The conductive foreign particle is lifted up and jumps above the bottom surface of the grounded tank as in the same manner when an AC voltage is applied.

(2) The conductive foreign particle travels to the central electric conductor immediately after being lifted up and jumps above the surface of the central electric conductor.

(3) The conductive foreign particle travels to the central electric conductor immediately after being lifted up, returns to the bottom surface of the grounded tank after reversing the traveling direction, and again travels toward the central electric conductor and which movement is repeated.

(4) After the conductive foreign particle is lifted up, a combined movement of above (1) through (3) is repeated and in some cases, the conductive foreign particle floats in the space between the central electric conductor and the grounded tank.

Based on the above investigation result, the present inventors noted that the behavior of the conductive foreign particle can be controlled by modifying the configuration of the central electric conductor and invented many kinds of suitable configurations of the central electric conductors. Namely, a first measure is to gradually change the diameter of the central electric conductor 3, and to utilize the following behavior that a lifted up conductive foreign particle once moves toward a narrow gap portion (a portion of the central electric conductor having a larger diameter) between the grounded tank 1 and the central electric conductor 3 and then from a predetermined position (depending upon a reversing angle of the conductive foreign particle) the conductive foreign particle returns toward a wider gap portion (a portion of the central electric conductor having a smaller diameter).

Since it is noted that the shape of the central electric conductor facing the bottom surface of the grounded tank is controlling, a second measure is to change the shape of the central electric conductor facing the bottom surface of the grounded tank in many ways so as to obtain the effect of the first measure, for example, by disposing a separate member, by inclining the central electric conductor and by machining the surface of the central electric conductor facing the bottom surface of the grounded tank.

Since it is noted that no conductive foreign particles finally approach to a portion of the central electric conductor having a larger diameter in view of the effect of the first measure, a third measure is to dispose insulator spacers at these sides for improving protection effect of the surface of the insulator.

Since it is noted that the conductive foreign particle is collected at a portion of the central electric conductor having a smaller diameter in view of the other side of the third measure, a fourth measure is to dispose a conductive foreign particle trapping device such as a low electric field region at such portion. Further, when the third measure is constituted in symmetry with regard to right and left, the conductive foreign particle is collected at the portion on the bottom surface of the grounded tank facing the center of the central electric conductor for improving trapping probability of the conductive foreign particle.

Figure 2:
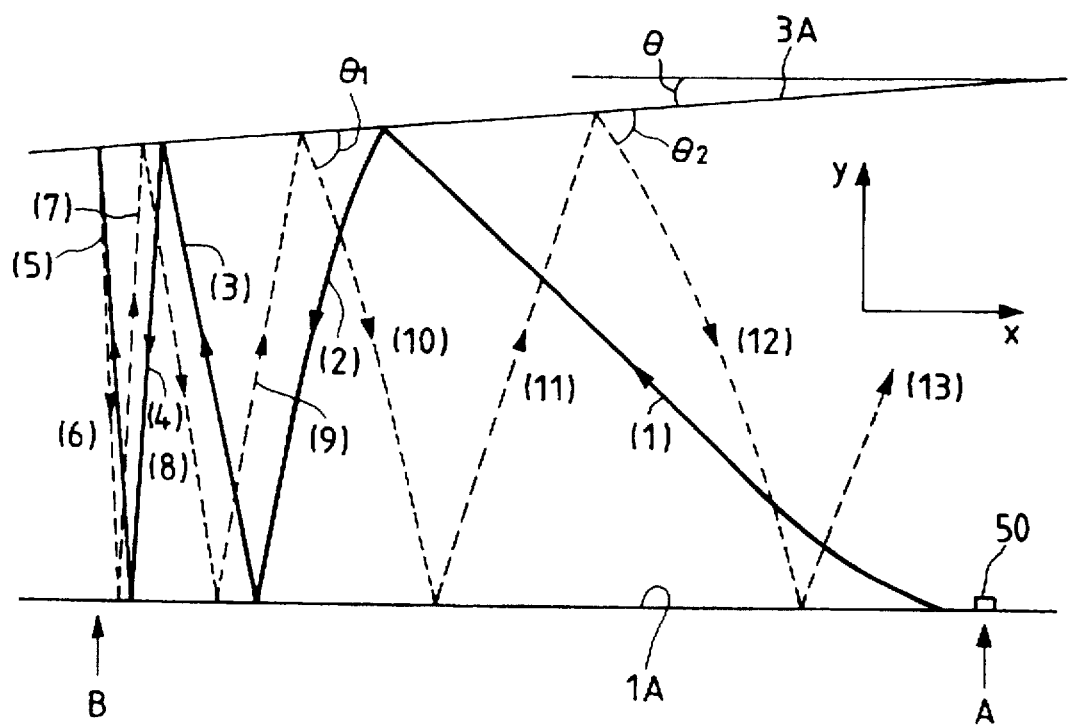
FIG. 2 is a principle characteristic diagram for explaining the function of FIG. 1 embodiment of the present invention.

A relationship between the shape of the inclined surface 3A and the behavior of the conductive foreign particle 50 is explained with reference to FIG. 2, which illustrates an example of calculated behaviors of the conductive foreign particle 50. Namely, a movement of the conductive foreign particle 50 in the space between the grounded tank 1 and the central electric conductor 3 is illustrated. When assuming the coordinate of the traveling space of the conductive foreign particle 50 as x and y as illustrated in FIG. 2, an equation of motion of the conductive foreign particle 50 is expressed as follows;

$$m\frac{d^2x}{dt^2} = -\frac{qVy}{\theta(x^2+y^2)} \quad (1)$$

$$m\frac{d^2y}{dt^2} = \frac{qVx}{\theta(x^2+y^2)} - mg \quad (2)$$

wherein, m : mass of conductive foreign particle, q : electric charge of conductive foreign particle, V : applied voltage, g : gravitational acceleration, θ : inclined angle of central electric conductor.

When there exists a conductive foreign particle 50 at a portion A in the grounded tank 1, the conductive foreign particle 50 is acted upon by a lifting force under a charged condition and is lifted toward direction (1). When the conductive foreign particle 50 reaches to the central electric conductor 3, the conductive foreign particle 50 receives an electric charge from the central electric conductor 3 and is bounded back toward direction (2) due to a repulsive force by an electric charge of the same polarity and the gravity thereof. Through repetition of such motion the conductive foreign particle 50 advances toward the left side of the drawing and then the advancing direction of the conductive foreign particle 50 is reversed at point B in the drawing and the conductive foreign particle 50 begins to advance toward the right side in the drawing, which behavior of the conductive foreign particle 50 is confirmed by experiments performed by the present inventors.

Namely, the conductive foreign particles 50 move from both sides of the central electric conductor 3 toward the center thereof in FIG. 1 and are collected at the conductive foreign particle trapping means 10. As a result, deposition of a conductive foreign particle 50 on the insulator spacers 2A, 2B is prevented which perform the most signifficant role for determining the insulation property of the enclosed electric conductor arrangement, and the reliability of the arrangement is highly improved.

The relationship between the conductive foreign particle 50 and the inclined surface 3A is further plainly explained.

When a DC voltage is applied to the central electric conductor 3, the conductive foreign particle 50 on the bottom surface 1A within the grounded tank 1 is electrically charged. The charged conductive foreign particle 50 is then attracted toward the central electric conductor 3 charged with opposite polarity and collides to the central electric conductor 3 where the polarity of the conductive foreign particle 50 is equalized with that of the central electric conductor 3 and thus the conductive foreign particle 50 again drops down to the bottom surface 1A at the lower potential side due to a repulsive force caused by the electric charges of same polarity and the gravity thereof, and a so called jumping up and down phenomenon of such conductive foreign particle 50 is repeated. However, the reversing angle of the conductive foreign particle 50 with respect to the inclined surface 3A reduces depending upon distance away from the insulator spacer 2A from θ1 to θ2. The conductive foreign particle 50 is collected at the conductive foreign particle trapping means 10 where the distance between the inclined surface 3A and the bottom surface 1A of the grounded tank 1 is maximum and is caught there. As a result, deposition of the conductive foreign particle 50 on the surface of the insulator spacers 2A, 2B is prevented, thereby the dielectric strength of the insulator spacers 2A, 2B is increased and the insulation reliability of the enclosed electric conductor arrangement for the gas insulated apparatus is enhanced. Further, based on the increased dielectric strength the size of the insulator spacers 2A, 2B is reduced, thereby the total size of the enclosed electric conductor arrangement for the gas insulated apparatus is also reduced.

Figure 3:
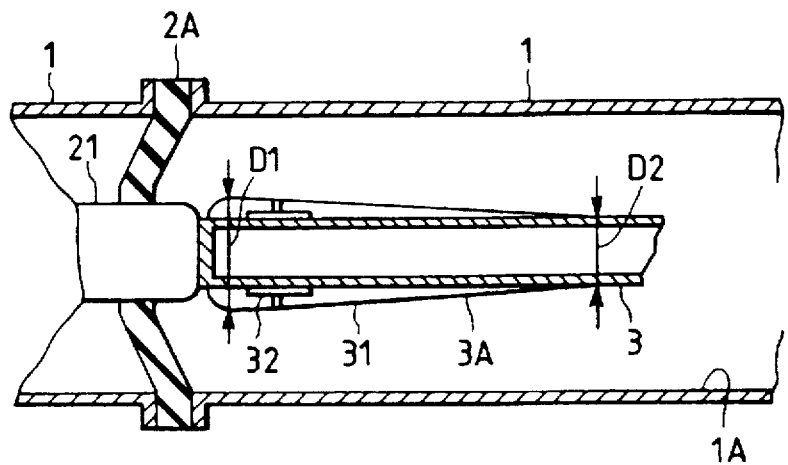
FIG. 3 is a cross sectional view showing another embodiment of enclosed electric conductor arrangements according to the present invention.

FIG. 3 shows another embodiment of the present invention in which a structure corresponding to the left half in FIG. 1 embodiment is illustrated. A cylindrical electric conductor having a same diameter is used for the central electrical conductor 3, however, around the circumference thereof an electrode 31, formed by a separate member is attached through metal fittings 32. The electrode 31 is provided with a like inclined surface 3A as in FIG. 1 embodiment. Thus constituting the present embodiment achieves substantially the same advantages of FIG. 1 embodiment, moreover the electrode 31 according to the present embodiment can be attached to an already installed central electric conductor 3 to thereby enjoy the same advantages as above.

Figure 4:
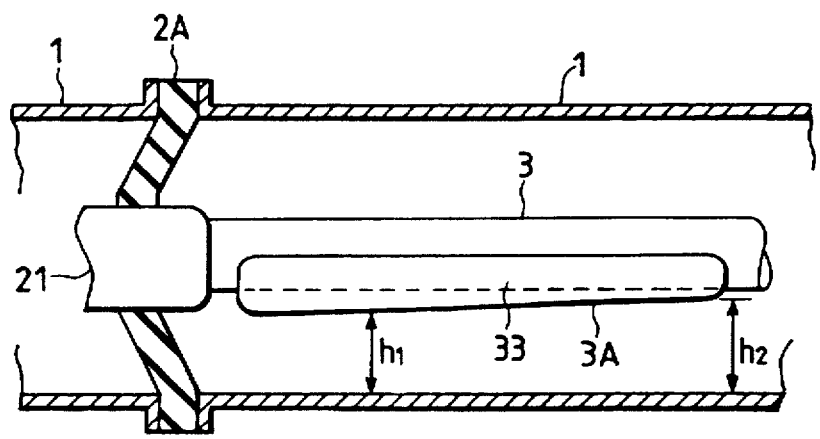
FIG. 4 is a cross sectional view showing still another embodiment of enclosed electric conductor arrangements according to the present invention.
Figure 5:
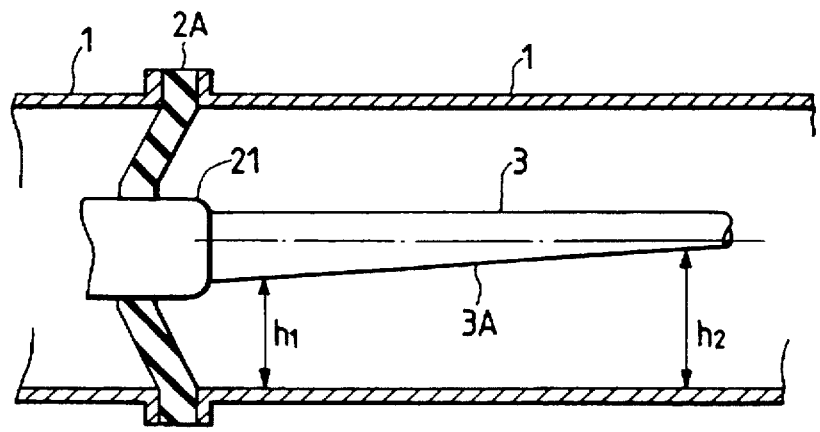
FIG. 5 is a cross sectional view showing a further embodiment of enclosed electric conductor arrangements according to the present invention.
Figure 6:
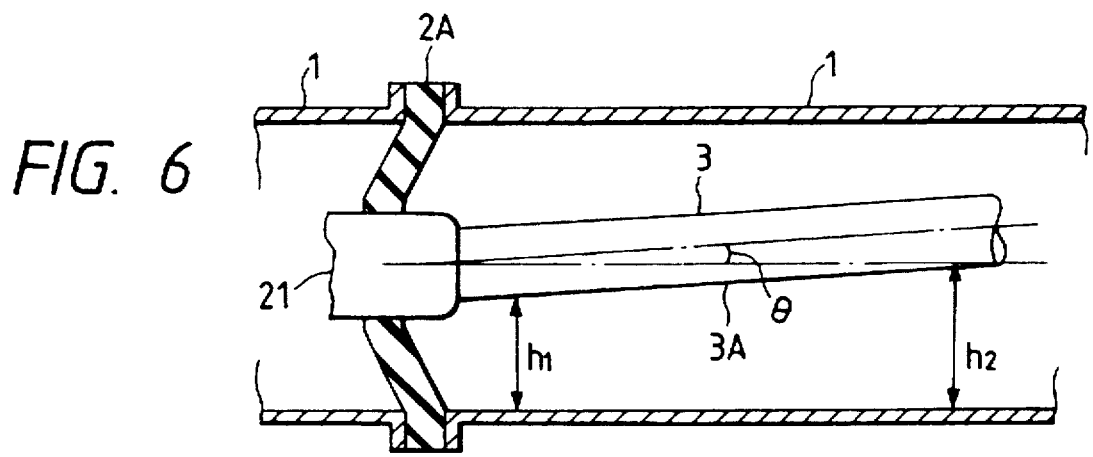
FIG. 6 is a cross sectional view showing a still further embodiment of enclosed electric conductor arrangements according to the present invention.

FIG. 4 through FIG. 6 also illustrate further modified examples of the central electric conductor 3.

FIG. 4 is an embodiment which is developed noting that the surface of the central electric conductor 3 facing the bottom surface 1A plays an important role for the behavior of the conductive foreign particle, in that, an electrode portion 33 is attached to the central electric conductor 3 to form an inclined surface 3A by determining gap h1 at the insulator spacer 2A side larger that gap h2 at the central portion.

FIG. 5 is another embodiment of the present invention in which the surface of the central electric conductor 3 only at the bottom side is machined so as to constitute an inclined surface 3A, thereby substantially the same advantages as the above embodiments can be achieved with the present embodiment.

FIG. 6 is a further embodiment of the present invention in which the inclined surface 3A is realized by disposing inclinedly the central electric conductor 3 by an angle θ without changing the diameter thereof. Accordingly, with the present embodiment, in addition to the advantages obtained with the above embodiments, the structure of the enclosed electric conductor arrangement for the gas insulated apparatus will be simplified.

Figure 7:
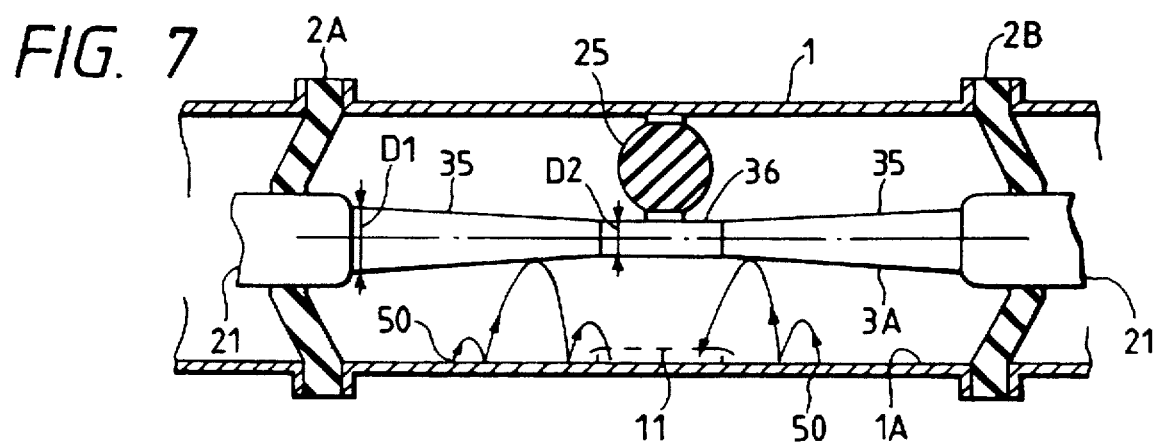
FIG. 7 is a cross sectional view showing a still further embodiment of enclosed electric conductor arrangements according to the present invention.
Figure 8:
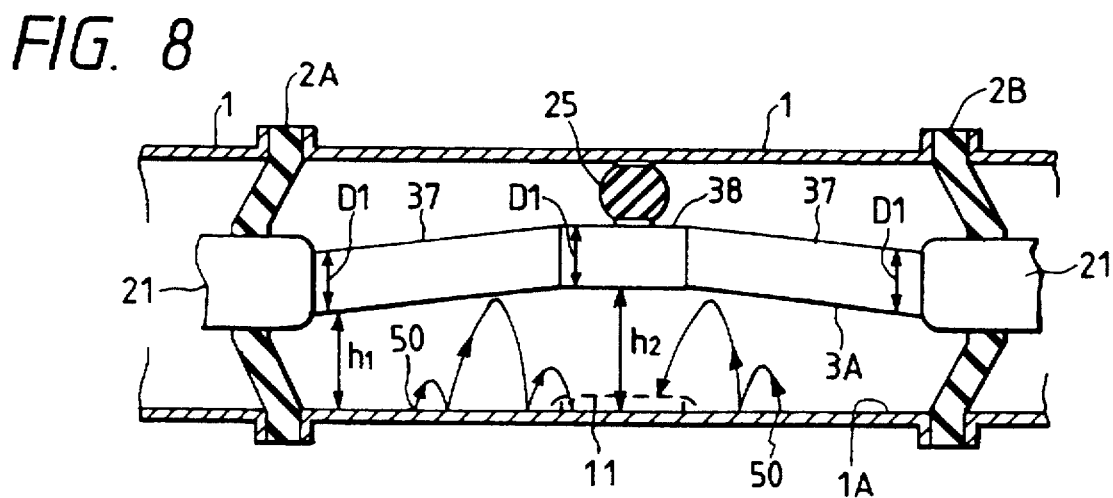
FIG. 8 is a cross sectional view showing a still further embodiment of enclosed electric conductor arrangements according to the present invention.

FIG. 7 and FIG. 8 show still further embodiments with a modified conductive foreign particle trapping means 11 such as a drainboard shaped trap and net shaped trap according to the present invention.

FIG. 7 is an embodiment according to the present invention in which the central electric conductor is composed by a pair of electric conductors 35 having changing diameter and an electric conductor 36 at the center thereof having a smaller diameter and supported by a supporting spacer 25, and the conductive foreign particle trapping means 11 is provided at the center bottom surface 1A of the grounded tank 1, thereby the conductive foreign particle 50 can be efficiently caught.

FIG. 8 is another embodiment according to the present invention in which the central electric conductor is composed of a pair of electric conductors 37 and an electric conductor 38 both having an identical diameter, however the electric conductors 37 at both sides are disposed inclinedly.

Through the use of the above explained structure and arrangement of the central electric conductor, even when a conductive foreign particle remains within the arrangement the conductive foreign particle is efficiently caught, thereby an enclosed electric conductor arrangement for a gas insulated apparatus exhibiting an excellent insulation reliability is obtained. Further, based on the obtained insulation reliability the size and weight of the arrangement can be reduced in comparison with conventional arrangement, thereby an enclosed electric conductor arrangement for gas insulated apparatus having a reduced production cost is realized.

As an alternative of the above embodiments, the bottom surface of the grounded tank can be formed in an inclined surface in such a manner that the spacing distance between the central electric conductor and the inclined surface gradually increases depending upon distance away from the insulator spacers. Further, a separate member having such inclined surface can be disposed on the bottom surface of the grounded tank. Still further, the present invention can also be applied to a non-gas filled insulated and enclosed tubular container.

According to the present invention, deposition of a conductive foreign particle remained in the arrangement on the insulator spacers is prevented and the conductive foreign particle can be efficiently caught, thereby an enclosed electric conductor arrangement for a gas insulated apparatus having an extremely high insulation reliability can be provided as well as the size and weight of the arrangement can be reduced.

We claim:

1. An enclosed electric conductor arrangement for DC current transmission, comprising a horizontally disposed grounded cylindrical tank, a plurality of insulator spacers disposed in said grounded tank and an electric conductor supported by said insulator spacers and insulated with respect to said grounded cylindrical tank;

wherein a surface of the electric conductor facing a bottom surface of said grounded cylindrical tank is inclined by gradually reducing a cross section of said electric conductor in relation to a distance between said electric conductor and said insulator spacers, whereby during an actual rated DC voltage application onto said electric conductor, a conductive foreign particle which moves back and forth between said grounded cylindrical tank and said electric conductor is shifted away from the insulator spacers.

2. An enclosed electric conductor arrangement for a DC current transmission according to claim 1, further comprising a conductive foreign particle trapping means provided at the bottom surface of said grounded cylindrical tank near a position showing a maximum spacing distance between the inclined surface of said electric conductor and the bottom surface of said grounded cylindrical tank, and a diameter of said electric conductor between said insulator spacers being gradually reduced in accordance with the distance between said electric conductor and said insulator spacers so as to form an inclined surface for said electric conductor.

* * * * *